June 14, 1932. J. E. WOODLAND 1,863,078
MATTING DEVICE FOR MOTION PICTURE PROJECTORS
Original Filed May 4, 1929   2 Sheets-Sheet 1
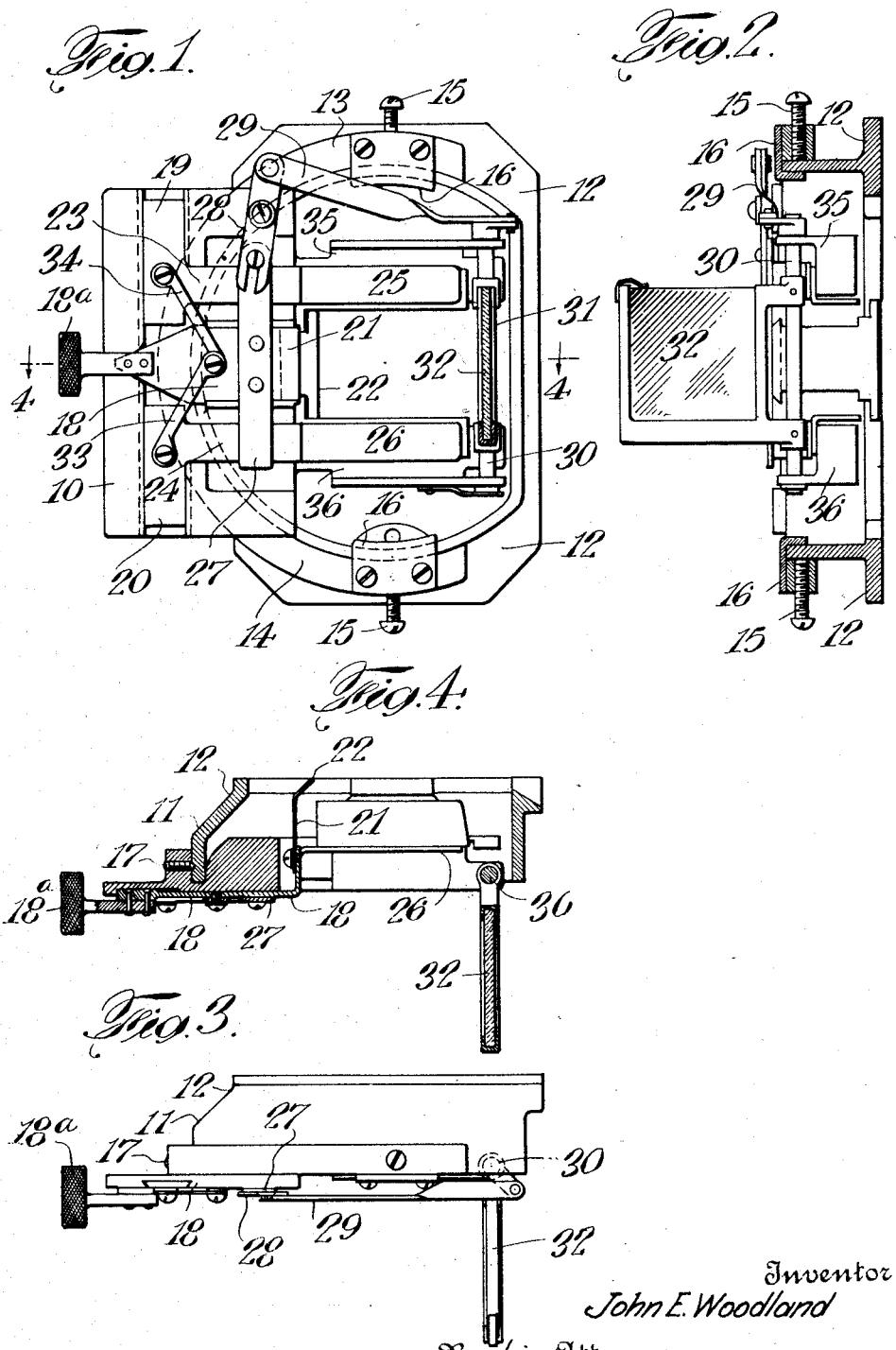
Inventor
John E. Woodland
By his Attorney
Robert I. Hulsizer June 14, 1932. J. E. WOODLAND 1,863,078
MATTING DEVICE FOR MOTION PICTURE PROJECTORS
Original Filed May 4, 1929  2 Sheets-Sheet 2
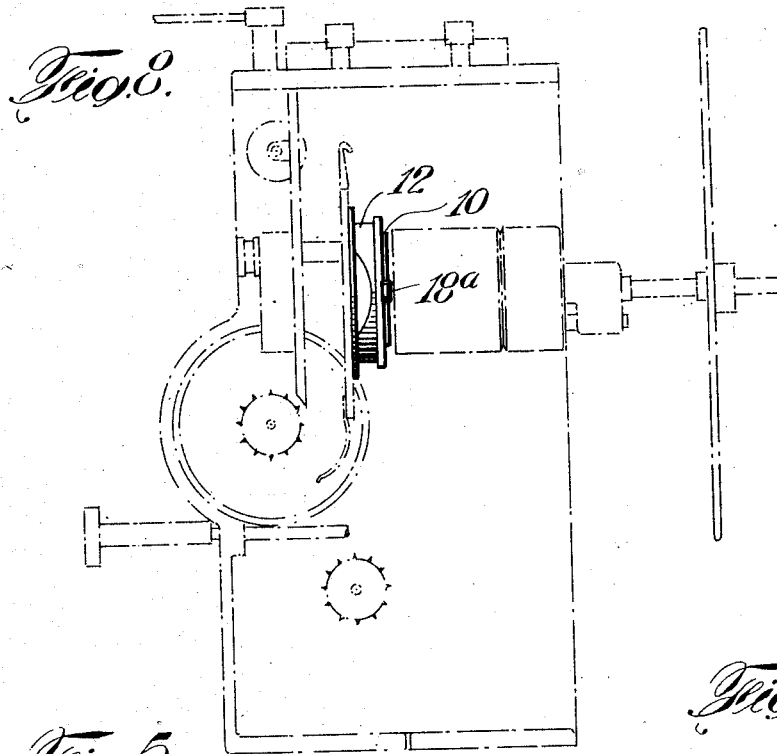
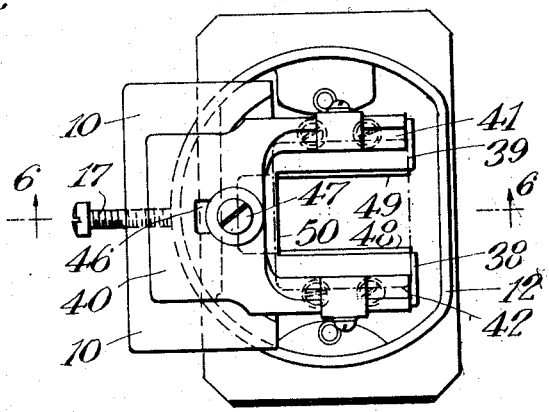
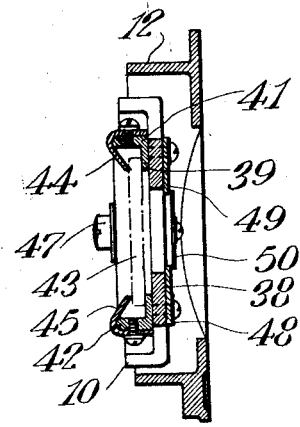
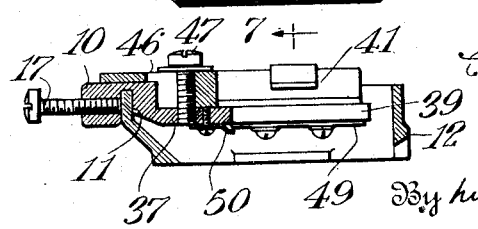
Inventor
John E. Woodland
By his Attorney
Robert J. Hulsizer Patented June 14, 1932

1,863,078

UNITED STATES PATENT OFFICE

JOHN E. WOODLAND, OF RICHMOND HILL, NEW YORK

MATTING DEVICE FOR MOTION PICTURE PROJECTORS

Application filed May 4, 1929, Serial No. 360,376. Renewed November 14, 1931.

This invention relates to projectors with particular reference to motion picture projectors and is especially applicable to projection machines when using the modern talking-picture film having sound striata along one lateral edge of the film.

In ordinary moving picture film practically the entire area of each picture section, within the sprocket teeth holes along each side, is occupied by the picture. When, therefore, sound striata are put along one edge, within the line of one series of tooth holes, it is at the expense of the lateral portion of the picture.

In projecting such a film, it is necessary not to project the lateral strip of striata and therefore to cover this portion. As a result, the remainder of the picture section is foreshortened as to its width and assumes a shape more square than oblong. If this shape of picture were thrown on the standard screen it would not properly be filled, since standard screens are designed for an oblong picture shape.

In accordance with this invention, a main object is to provide a simple, compact, durable device which can be quickly and easily attached to and removed from any standard projector without in the slightest degree disturbing its construction and operation, and which can be readily adjusted and manipulated by the operator to cover the striata portion of the beam and modify the remainder to produce an oblong outline and then optically enlarge it so that the standard screen is fully covered as usual.

A further object is to provide means whereby the device above mentioned can be instantly manipulated, even while attached to a running machine, to change the operative relation and position of the parts and to shift in an instant from the use of "talkie" film to standard film without requiring stoppage of the machine and without interfering with the projection.

A still further object is to provide a simple device which is made and constructed so economically that its additional cost is slight compared to the cost of the projector and compared to the benefits derived from its use.

Further and more specific objects, features, and advantages will more clearly appear from the detailed description given below taken in connection with the accompanying drawings which form part of the specification and which illustrate one embodiment of the invention.

In its general aspects, the invention comprises a frame readily attached to the projection head of a machine adjacent the film, preferably to the film protector plate tube adjacent the film and its aperture. On the frame are slidable plates or matting devices which are movable to cut off the edges of the beam as desired to vary the resultant outline of the picture projected and to cover the striata portion of the beam. Associated and operated with the matting plates is a lens support pivotally mounted on the frame and having a plurality of positions. In one position, when the matting affords a full standard opening for the projected light beam, the lens support is positioned to one side of the beam and does not interrupt it. In another position, when the matting plates are moved to reduce the size and shape of the beam projected, the lens support is moved to lie across the beam. The lens in the support is designed to optically enlarge and spread the beam, which would otherwise be foreshortened, so that when it reaches the screen it fills it properly as before. Means such as a hand operable member is attached to the matting plates, which are connected to the lens support, so that the movement of this operating member, such as a knob or button, in one direction, will move the lens support and the matting plates back to permit the usual film section to be projected. When the button is moved in the other direction, the matting plates are disposed to interrupt the edges of the beam and the lens support is moved across the beam as above mentioned. This action therefore can take place while the device is attached and in an instant's time.

The operator, therefore, after once attaching the device to the machine, adapts it for standard or "talkie" film operation merely by pushing a knob or button one way or the other without injury to any parts or to the film and without having to stop the machine or make adjustments of the device after it has once been applied and adjusted.

A present preferred form of the invention is illustrated in the drawings, in which, Fig. 1 is a front elevation of the device attached;

Fig. 2 is a side elevation thereof;

Fig. 3 is a plan view;

Fig. 4 is a horizontal section, taken on the line 4—4 of Fig. 1;

Fig. 5 is a front elevation of a modified form of the device;

Fig. 6 is a horizontal section taken on the line 6—6 of Fig. 5;

Fig. 7 is a vertical section taken on the line 7—7 of Fig. 5, and,

Fig. 8 is a side view of the head of a projector with one form of the invention in place.

As shown in the drawings, one form of the invention comprises a frame plate 10 having on one face an arcuate groove 11 into which extends a portion of the edge of the usual film protector plate tube such as 12. Arcuate arms 13 and 14 extend laterally from the plate 10 around the outside of the tube 12 and are provided with set screws such as 15 to clamp them to the tube. At these points the arms have flanges 16 on the inner sides of the tube to firmly hold the arms against the tube. At the center of the frame 10 is another set screw 17 engaging the outer face of the tube 12. It is only an instant's time to place the plate 10 on the end of the tube 12 and tighten up the set screws to hold it in place.

On the other face of the frame plate 10 are disposed three slidable blocks 18, 19, and 20. The block 18 slides in a groove on the plate 10 in a line horizontally as shown in Fig. 1 whereas the blocks 19 and 20 slide in separate grooves aligned with each other but vertically as shown in the same figure. Attached to the face of the block 18 is a matting plate 21 which as seen in Fig. 4 extends in a direction parallel to the axis of the light beam and has its outer end 22 bent to act as a matting edge for the beam.

Attached to the blocks 19 and 20 are matting plates 23 and 24 which extend horizontally therefrom and having outer portions 25 and 26 offset along the axis of the beam and disposed above and below the opening through which the beam normally extends. The block 18 carries a bar 27 the upper end of which is pivotally connected to a link 28 pivotally fastened to the frame plate 10. The outer end of the link 28 is pivotally connected to a lever arm 29 the other end of which pivotally connects to a short arm attached to the upper end of a vertical shaft 30. This shaft 30 supports a lens frame or support 31 within which a suitable lens 32 is disposed. The normal line of the lens support 31 is at the side of the opening through which the projection beam extends so that in the position shown in Fig. 1, the lens support is to one side and out of the way of the beam. The rear of the block 18 is tapered to fit into a similarly shaped slot in the frame plate 10 and has an operating knob or button 18a thereon by which the block may be slid back and forth in its groove.

The block 18 is connected to the blocks 19 and 20 by means of the links 33 and 34 so that as the block 18 is moved inward the blocks 19 and 20 are moved downward and vice versa.

The lens support shaft 30 is pivotally supported on upper and lower lateral extensions 35 and 36 of the frame plate 10. The blocks above mentioned have dove tailed edges and the grooves in which they slide are accordingly shaped so that the sliding action may take place without the blocks dropping out of their respective grooves.

It will be observed from a consideration of Figs. 3 and 4 that most of the parts of this attachment lie within the end face of the tube 12 to which the attachment is fastened and that with the exception of the lens support 31 the parts do not extend beyond this face more than a fraction of an inch. The device is so designed that there is ample room on the standard projector for it to be put into place and operated.

In the operation of the device, the attachment is quickly slipped over the end of the tube 12 and the set screws tightened. If the ordinary film is being used, the knob 18a is pulled outwardly so that the block 18 is moved outwardly. This causes the matting plate 22 to be moved out of the path of the beam and the blocks 19 and 20 are moved upwardly and downwardly to cause the matting plates 25 and 26 to be correspondingly moved to be out of the way of the beam. In this position of the knob 18a the connections to the lens support 31 cause it also to be positioned as shown in Fig. 4 out of the way of the beam.

When the knob 18a is moved inwardly, the parts and plates above mentioned and the lens support 31 are moved in the opposite direction and the matting plates are caused to move across part of the outer edges of the beam to reduce the beam size and change its shape and cut off the sound striata in the beam and the lens support 31 then lies across the beam at right angles to its normal position and thus interrupts the beam and is designed to enlarge or modify the light to cause the reduced picture area of the beam nevertheless to fill the usual standard picture screen.

In the form of the invention shown in Figs. 5–8 the frame plate 10 has the rear groove 11 as before and the set screw 17. It is also adapted to be attached to the film protector tube 12. This plate frame has a depressed seat portion 37 from which extend spaced arms 38 and 39. On these arms is mounted a lens frame having a body portion 40 and spaced arms 41 and 42 L-shaped and receiving a lens 43 thereon and held in position by means of finger pieces 44 and 45 screwed to the sides of the arms 41 and 42. The lens frame 40 has a slot 46 therein in which is disposed a screw 47 engaged with the frame plate 10 so that the lens frame 40 can be adjusted with the respect to the frame plate 10 and the beam of light which passes between the arms 41 and 42.

On the bottom of the arms 38 and 39 of the frame plate 10 are disposed slotted matting plates 48, 49, and 50 the first two of which are disposed directly on the arms and the other of which is disposed on the bottom of the seat portion 37. The plates 48 and 49 are slidably adjustable by means of screws to cut off portions of the top and bottom of the beam and the plate 50 is adapted to cut off one side of the beam preferably the side carrying the movie-tone striata. By attaching this device to the tube 12 and then adjusting the matting plates thereon and the lens support the machine can be adapted for movie-tone work and no further adjustment is necessary.

It will be particularly noted that in each of these forms of the invention the matting plates for the most part are so supported as to lie well within the end of the tube 12, and this is for the reason that when they are thus close to the film the production of dark spots and shadows on the screen are avoided and for this reason the matting plates are disposed as near to the film as possible while still permitting the device to be readily applicable to and removable from the tube.

By carefully designing the parts, the attachment can be applied to a standard projector without any necessity to change its arrangement and construction and will, in its operation, cut off just the right amount of the beam area for the purposes mentioned and then enlarge the remainder by means of the swingable lens described. It is also obvious that the device, after once being adjusted on a given machine, needs no further attention and can instantly adapt the machine for use with either standard film or talkie film as desired.

While I have described my improvement in detail and with respect to a preferred form thereof, I do not desire to be limited to such details or forms since many changes and modifications may be made and the invention embodied in other forms without departing from the spirit and scope of the invention in its broader aspects. Hence I desire to cover all forms and modifications coming within the language and scope of any one or more of the appended claims.

What I claim as new and desire to secure by Letters Patent, is,

1. In combination with a frame to be attached to a projector machine between the film and the screen, movable matting plates on said frame, a movable lens support on said frame, said support being movable into and out of the path of the projection light beam and means operatively associating the matting plates with the lens support to cause movement of the one with the other.

2. A device for motion picture projectors comprising a movable matting plate, a lens support, said support being movable into and out of the path of the projection light beam, and means associating them to cause movement of one with the other.

3. A matting device for motion picture projectors comprising a movable plate disposed at the side of the beam to cut off a portion of the beam, other movable plates disposed at the top and bottom of the beam to cut off portions of the beam at the top and bottom, a single means connected to said plates to move them simultaneously toward and away from the edges of the beam, a lens support disposed along one edge of the beam, and means connecting the lens support with the moving means to cause its movement with the plates.

4. A matting device for motion picture projectors comprising a plurality of matting plates disposed movably along the edges of the beam, a common means for moving all of said plates toward and away from the edges of the beam, a lens support disposed along the edge of the beam and connected to said common means whereby it is moved with the plates said support constructed and arranged to be moved into and out of the path of the projection light beam.

5. A matting device for motion picture projectors comprising a frame attachable to the machine in the vicinity of the film and across the beam, said frame having an opening therein, a plurality of matting plates on said frame and disposed to lie adjacent the edges of the beam, means permitting the adjustment of the plates to cut off portions of the edges of the beam, and a lens pivotally mounted on said frame and adapted to swing out of the way of the beam in one position and across the beam in another position.

6. A matting device for motion picture projectors comprising a frame attachable to the end of the film protector tube, means on the frame to clamp said tube, a plurality of movable matting plates on said frame and disposed to lie along the edges of the beam within the end of the tube, a lens support mounted pivotally on said frame and disposed to lie normally parallel at one side of the beam, means connected to said plates and said lens support to move the plates to cut off portions of the edges of the beam when moved in one direction and to move the lens support across the beam when thus moved, said moving means restoring these elements to normal position when moved in the opposite direction.

7. In combination with a film protector tube, a frame attachable thereto, a plurality of matting plates slidably disposed on said frame, said frame arranged and constructed so that the matting plates lie substantially well within the tube toward the film to avoid the formation of shadows and imperfections of the picture on the screen, a movable lens support on said frame, said support being movable into and out of the path of the projection light beam and means operatively associating the matting plates with the lens support to cause movement of the one with the other.

In testimony that I claim the invention set forth, I affix my signature hereto.

JOHN E. WOODLAND.